(12) United States Patent
Payne et al.

(10) Patent No.: US 7,362,320 B2
(45) Date of Patent: Apr. 22, 2008

(54) ELECTRONIC DEVICE HAVING A LIGHT EMITTING/DETECTING DISPLAY SCREEN

(75) Inventors: David M. Payne, Star, ID (US); John W. Huffman, Meridian, ID (US); Phillip R. Luque, Boise, ID (US); Tim M. Hoberock, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 686 days.

(21) Appl. No.: 10/454,934

(22) Filed: Jun. 5, 2003

(65) Prior Publication Data

US 2004/0245438 A1 Dec. 9, 2004

(51) Int. Cl.
*G06F 3/038* (2006.01)

(52) U.S. Cl. .................... 345/207; 345/82; 345/173

(58) Field of Classification Search ........ 345/173–175, 345/207, 199, 179, 82, 76–83
See application file for complete search history.

(56) References Cited

U.S. PATENT DOCUMENTS

| | | | |
|---|---|---|---|
| 4,056,719 A | 11/1977 | Waaben | |
| 4,893,120 A * | 1/1990 | Doering et al. | ............... 341/31 |
| 5,097,299 A | 3/1992 | Donhowe et al. | |
| 5,625,470 A | 4/1997 | Ueta et al. | |
| 5,828,050 A | 10/1998 | Barkan | |
| 6,139,174 A | 10/2000 | Butterworth | |
| 6,215,200 B1 * | 4/2001 | Genzel | ...................... 307/10.1 |
| 6,299,329 B1 | 10/2001 | Mui et al. | |
| 6,369,890 B1 | 4/2002 | Harley | |
| 6,542,138 B1 * | 4/2003 | Shannon et al. | ............... 345/76 |
| 6,677,934 B1 * | 1/2004 | Blanchard | .................... 345/175 |

\* cited by examiner

*Primary Examiner*—Richard Hjerpe
*Assistant Examiner*—Kimnhung Nguyen

(57) ABSTRACT

Exemplary methods, apparatuses, media, and arrangements enable the implementation of one or more features in electronic devices that have (e.g., display) screens that are capable of light emission and detection. These features include, for example, scanning, (simulated) touch-screen sensitivity, and ambient light determination and compensation. The display screens may be comprised of light emitting/detecting elements, such as diodes, that can emit light for visual display and can detect light for receiving light information data. In certain described implementations, a method for implementing a feature using a display screen with emitting/detecting elements includes the actions of: activating multiple elements of an array of elements to emit light; activating multiple elements of the array of elements to detect light; producing detected light data representing the light detected by the multiple elements that are activated to detect light; and processing the detected light data to implement the feature.

15 Claims, 11 Drawing Sheets

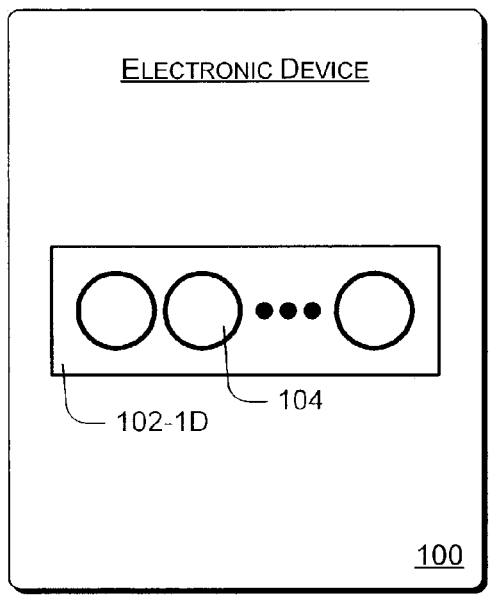
FIG. 1
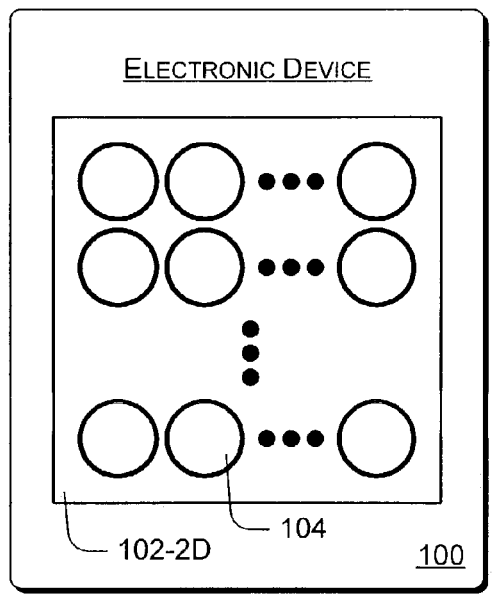
FIG. 2
| DIODE STATE KEY | ILLUSTRATION |
|---|---|
| GENERAL / ANY | ◯ 104 |
| INACTIVE | ◌ 108 |
| EMITTING | ✡ 110 |
| DETECTING | ◎ 112 |
FIG. 3

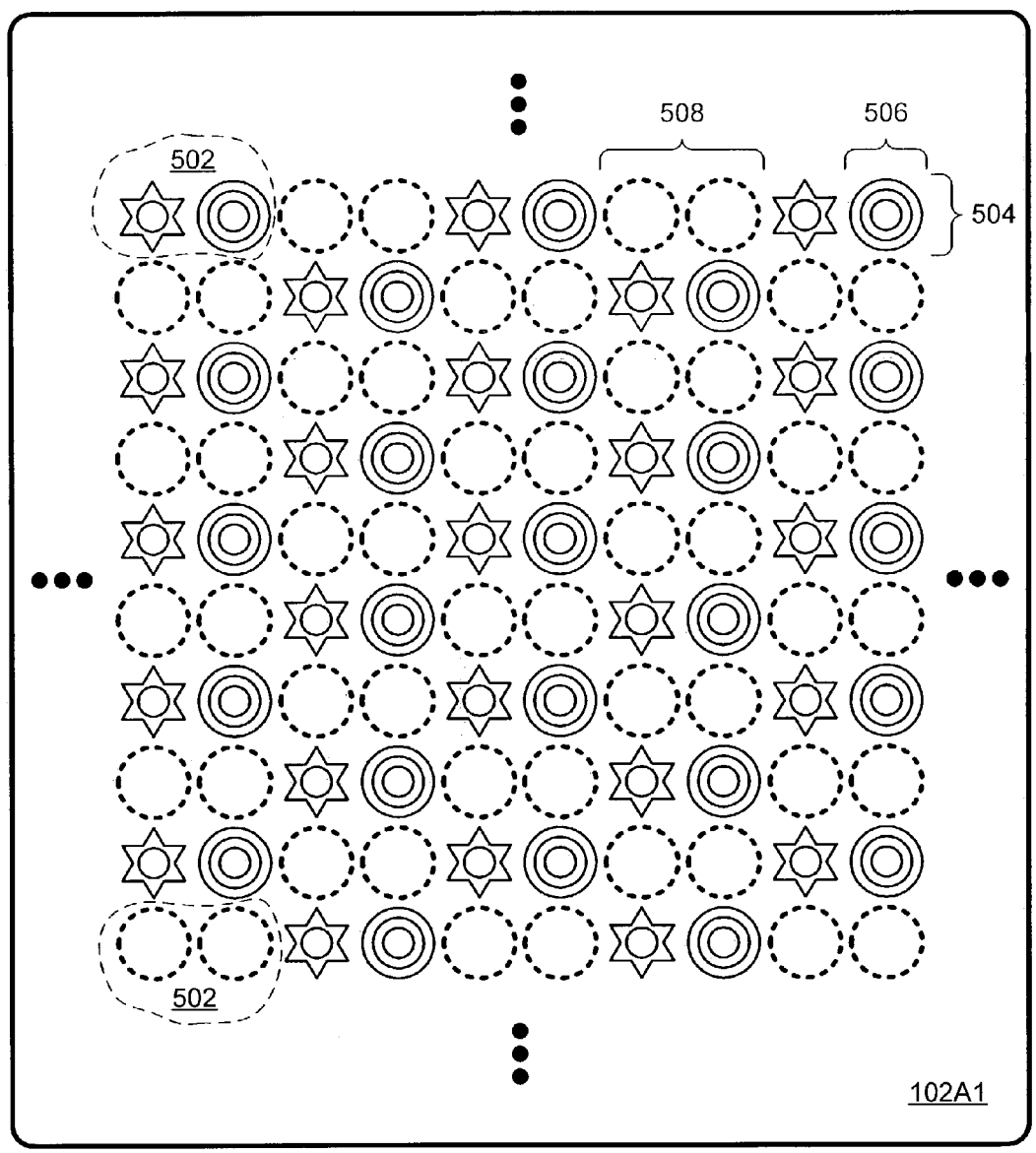
FIG. 5A1

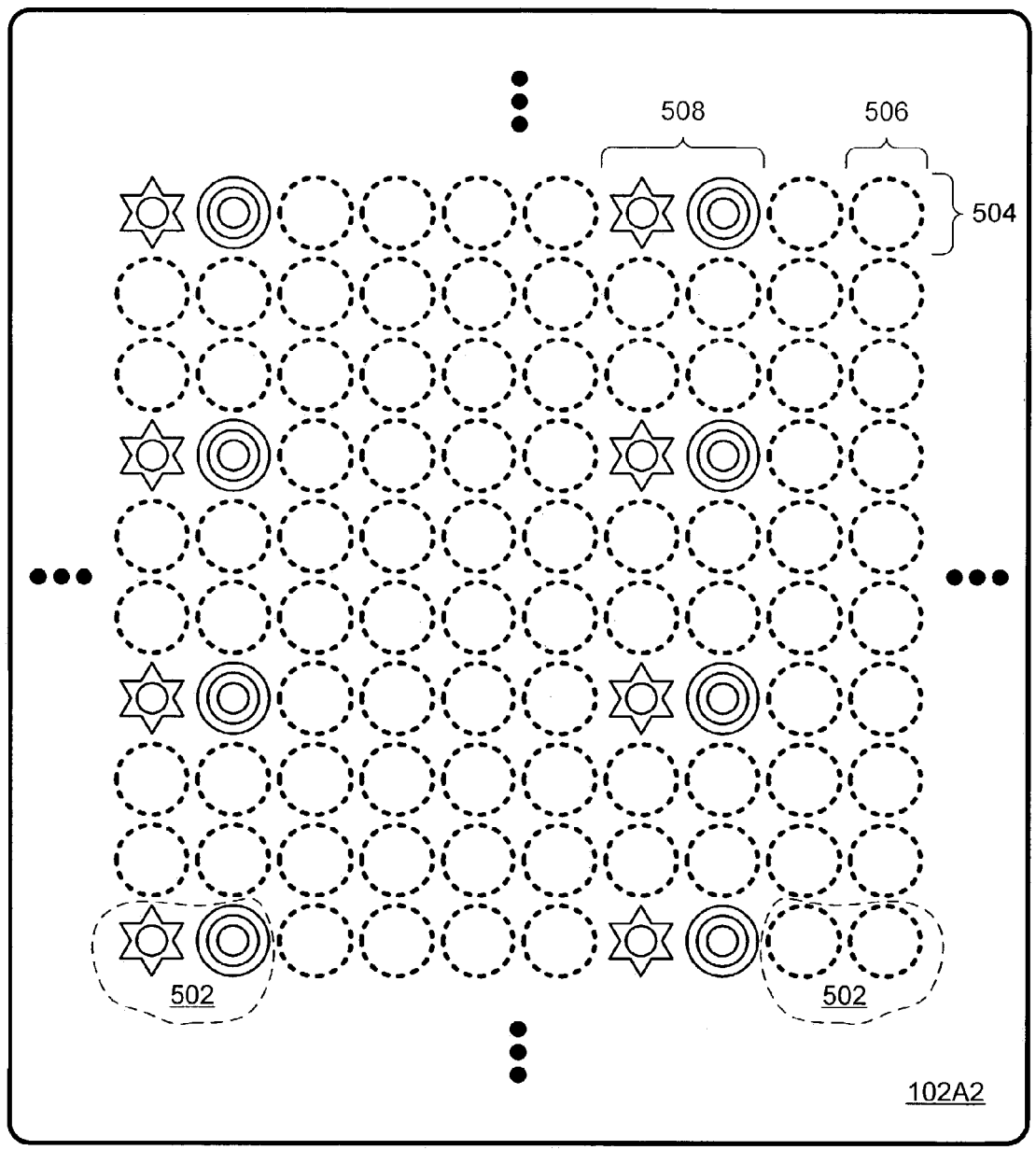
FIG. 5A2

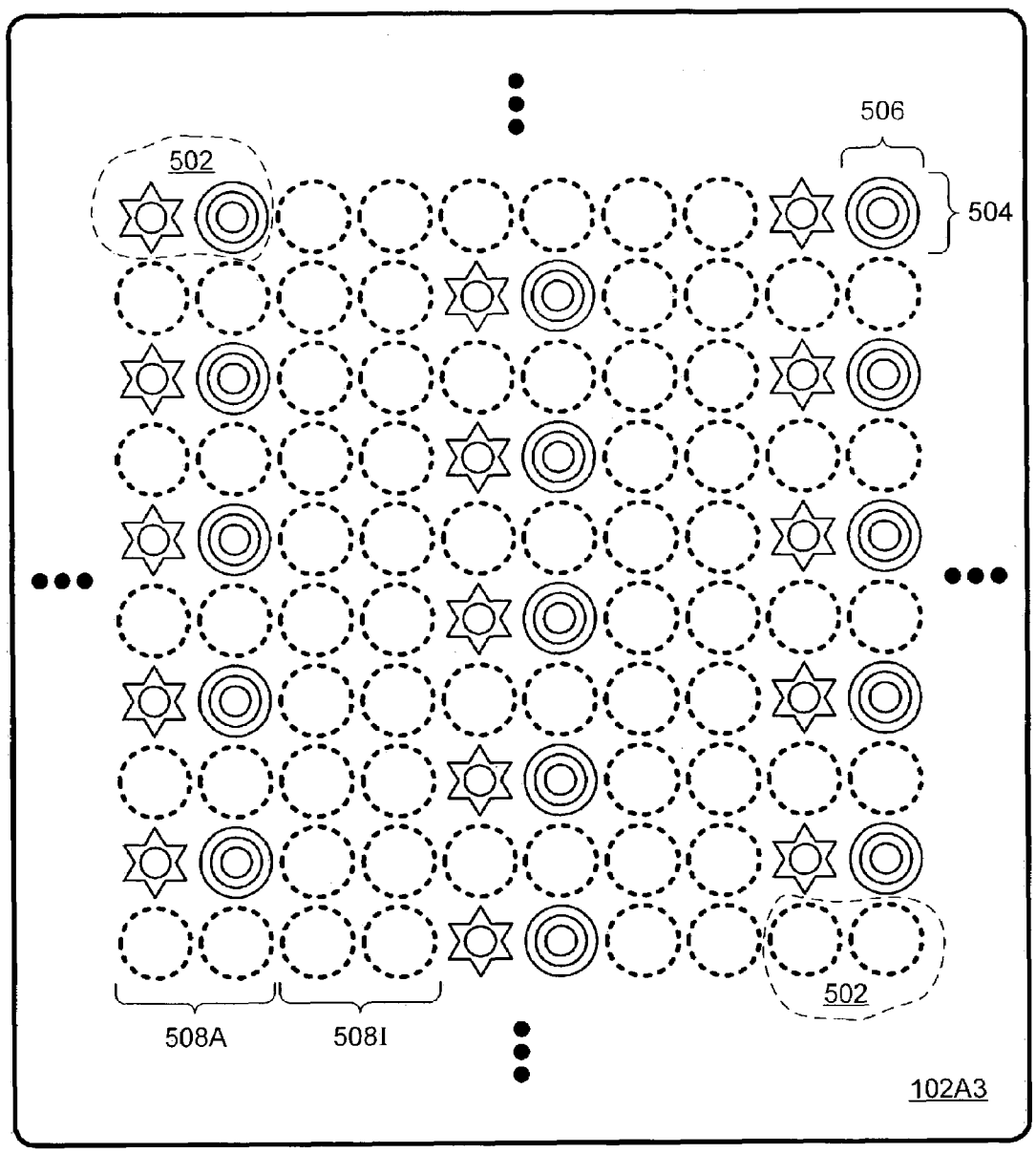
FIG. 5A3

US 7,362,320 B2

ELECTRONIC DEVICE HAVING A LIGHT EMITTING/DETECTING DISPLAY SCREEN

TECHNICAL FIELD

This disclosure relates in general to the field of electronic devices that have display screens, and in particular, by way of example but not limitation, to using light emitting/detecting diodes with display screens to enable functions and features such as scanning, (simulated) touch sensitivity, and ambient light determination and compensation.

BACKGROUND

Many electronic devices include display screens for presenting visual information. These display screens can range in size, for example, from that of a watch or car radio to that of a desktop monitor or large sign. Display screens are traditionally manufactured using a cathode ray tube (CRT), plasma display technology, standard light emitting diodes (LEDs), liquid crystal display (LCD) technology, or another conventional approach. Each of these conventional approaches are limited in that the display screens only present visual information. They fail to acquire or even notice light stimulus information for processing by the associated electronic device.

SUMMARY

Exemplary methods, systems, apparatuses, device, media, and arrangements enable the implementation of one or more features in electronic devices that have (e.g., display) screens that are capable of light emission and light detection. These features include, for example, scanning, (simulated) touch-screen sensitivity, and ambient light determination and compensation. The display screens may be comprised of light emitting/detecting elements, such as diodes, that can emit light for visual display and can detect light for receiving light information data.

In exemplary described implementations, a method for implementing a feature using a display screen with emitting/detecting elements includes the actions of: activating a first multiplicity of elements of an array of elements to emit light; activating a second multiplicity of elements of the array of elements to detect light; producing detected light data representing the light detected by the second multiplicity of elements; and processing the detected light data to implement the feature. In other exemplary described implementations, an electronic device that is capable of displaying information includes: a display screen that includes an array of elements, each element of the array of elements capable of emitting light and detecting light; and electronically-executable instructions that are capable of causing the electronic device to activate a first multiplicity of elements of the array of elements to emit light and a second multiplicity of elements of the array of elements to detect light in order to implement a feature for the electronic device.

In an exemplary described ambient-light-compensation feature implementation, an electronic device includes: a display screen that is capable of light emission and light detection; wherein the electronic device is configured to perform actions that include: determine a light level using the light detection capability of the display screen; and adjust a light amount that is output by the light emission capability of the display screen responsive to the determined light level.

In an exemplary described scanning feature implementation, an electronic device includes: a display screen that is capable of light emission and light detection; wherein the electronic device is configured to perform actions that include: illuminate a scanning target using the light emission capability of the display screen; collect light detection data representative of at least part of the scanning target using the light detection capability of the display screen; and process the light detection data to produce an image of at least a portion of the scanning target.

In an exemplary described (simulated) touch-sensitive feature implementation, the electronic device includes: a display screen that is capable of light emission and light detection; wherein the electronic device is configured to perform actions that include: establish a plurality of actuators on the display screen using the light detection and the light emission capabilities of the display screen; and actuate at least one actuator of the plurality of actuators responsive to a reduction in light that is detected at the at least one actuator using the light detection capability of the display screen.

Other method, system, apparatus, device, media, arrangement, etc. implementations are described herein for various exemplary features.

BRIEF DESCRIPTION OF THE DRAWINGS

In the Drawings, like numerals are used for like and/or corresponding features, aspects, and components of the various FIGS. 1-8C.

FIG. 1 is an electronic device that illustrates an exemplary display screen having a one-dimensional array of light emitting/detecting diodes.

FIG. 2 is an electronic device that illustrates an exemplary display screen having a two-dimensional array of light emitting/detecting diodes.

FIG. 3 is a key that illustrates exemplary diode states for the display screens of FIGS. 1, 2, 5A1, 5A2, 5A3, 5B, and 5C.

FIGS. 5A1, 5A2, and 5A3 illustrate exemplary diode state configurations for a scanning feature of a display screen of a laptop.

DETAILED DESCRIPTION

Figure 4A:
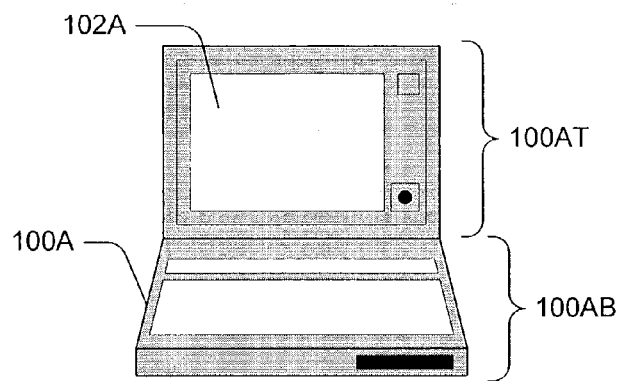
FIGS. 4A, 4B, and 4C illustrate exemplary electronic devices that include a laptop computer, a separate display screen, and a car radio, respectively.

FIG. 1 is an electronic device 100 that illustrates an exemplary display screen having a one-dimensional array 102-1D of light emitting/detecting diodes 104. One-dimensional array 102-1D is a relatively flat display screen for electronic device 100 that is capable of emanating light, such as for visually communicating information to a user, an operator, the surrounding environment generally, and so forth. As described further below, one-dimensional array 102-1D is also capable of receiving information from a user, an operator, the surrounding environment generally, and so forth.

Electronic device 100 may be any electronic device with a display screen, including a watch or clock; a mobile phone; a personal digital assistant (PDA); a palm or pocket-sized computer; an entertainment device such as a radio, DVD player, set-top box, etc.; a tablet personal computer; a separate display screen such as a monitor, sign, or billboard; an ordering or inventory-management terminal; a laptop computer; and so forth.

FIG. 2 is an electronic device 100 that illustrates an exemplary display screen having a two-dimensional array 102-2D of light emitting/detecting diodes 104. Two-dimensional array 102-2D is also a relatively flat display screen for electronic device 100 that is capable of emanating light, such as for visually communicating information to and receiving information from a user, an operator, the surrounding environment generally, and so forth. Although not so illustrated, electronic device 100 may have more than one one-dimensional array 102-1D and/or more than one two-dimensional array 102-2D.

It should be understood that the term display screen as used herein does not necessarily imply that there is a display for human interpretation/consumption in all implementations. Instead, the term display screen may imply that light is generally displayed from the screen by being emitted by one or more light emitting/detecting diodes, especially in certain implementations such those directed to a scanning feature. Also, a screen may not display light to implement a given feature, especially in certain implementations such those directed to a touch-sensitive feature. Furthermore, although certain implementations described herein focus predominantly on light emitting/detecting diodes, it should be noted that implementations may alternatively employ light emitting/detecting elements in general.

FIG. 3 is a key 106 that illustrates exemplary diode states for the display screens of FIGS. 1, 2, 5A1, 5A2, 5A3, 5B, and 5C. Each individual diode 104, as noted above, may function as a light emitting/detecting diode 104 (or more generally as a light emitting/detecting element). In other words, each diode 104 may be emitting light at one moment and detecting light at another moment. A voltage (i) provided to a diode 104 or (ii) produced and measured at the diode 104 determines whether the diode 104 is (i) emitting light or (ii) detecting light, respectively. Thus, each diode 104 (or element generally) is adapted to interact with/manipulate light from both an emitting and a detecting perspective.

Each individual diode 104 may alternatively be in an inactive state in which it is neither emitting nor detecting. Diode state key 106 indicates the graphical appearance of the various diode states. The solid circle indicates a diode in a general, any, or do not care diode state 104. The broken circle indicates a diode in an inactive diode state 108. The star or light-emanating-graphic indicates a diode in an emitting diode state 110. The three solid concentric circles indicate a diode in a detecting diode state 112.

A given diode may be in a general/any/do not care state 104 when, for example, the given diode may be inactive, emitting, or detecting without adversely affecting an intended function, feature, or result being achieved by proximate or otherwise related diodes. These different diode state graphics 104, 108, 110, and 112 are used in FIGS. 1, 2, 5A1, 5A2, 5A3, 5B, and 5C to illustrate various diode state configurations that are used to implement scanning, touch-sensitive, and ambient light determination/compensation features with display screens.

Figure 4B:
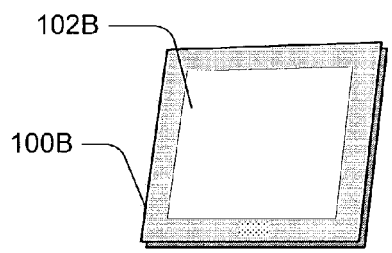
Figure 4C:
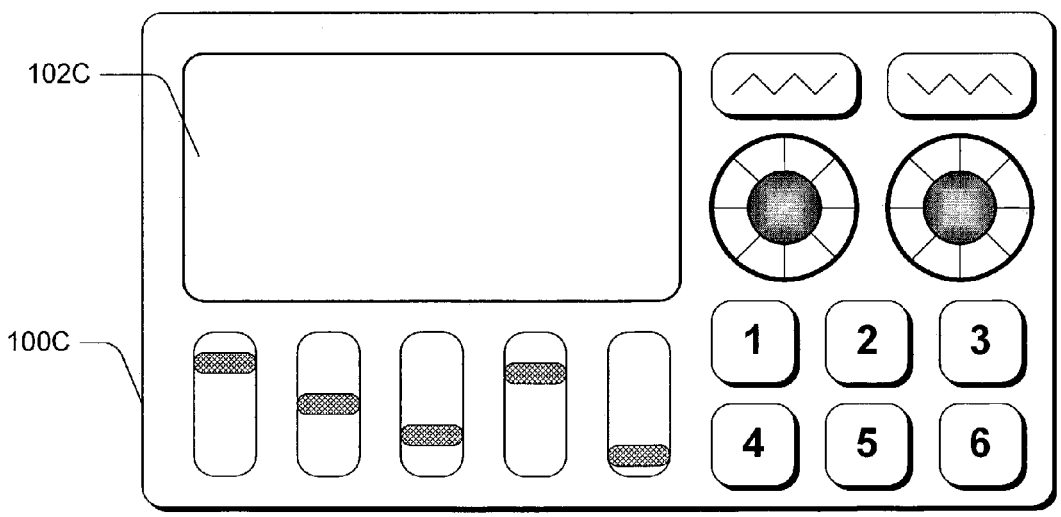

FIGS. 4A, 4B, and 4C illustrate exemplary electronic devices 100 that include a laptop computer 100A, a separate display screen 100B, and a car radio 100C, respectively. Laptop computer 100A, separate display screen 100B, and car radio 100C each includes a display screen 102A, 102B, and 102C, respectively. Each of the display screens 102 include multiple light emitting/detecting diodes 104 (not explicitly shown in FIGS. 4A, 4B, and 4C).

For FIG. 4A, laptop computer 100A is an exemplary electronic device 100 that is used to describe an exemplary scanning feature that may be implemented using display screen 102A. A document (or item) to be scanned is placed on the keyboard of bottom or keyboard portion 100AB. Display screen 102A is then brought into proximity with the document by rotating and fully or partially closing top or screen portion 100AT. The multiple light emitting/detecting diodes 104 that are arranged into a two-dimensional (or 1-D) array on display screen 102A systematically emit, detect, and become inactive in order to receive information representative of the appearance of the document (e.g., to scan in text, drawings, photographs, etc.). It should be noted that a scanning feature may be implemented outside of a laptop computer environment. Exemplary appropriate diode state configurations for display screen 102A are described further below with reference to FIGS. 5A1, 5A2, and 5A3, and a related method is described below with reference to FIG. 8A.

For FIG. 4B, separate display screen 100B is an exemplary electronic device 100 that is used to describe an exemplary touch-sensitive screen feature that may be implemented using display screen 102B. The multiple light emitting/detecting diodes 104 that are arranged into a two-dimensional (or 1-D) array on display screen 102B systematically emit, detect, and optionally become inactive in order to receive information representative of user input in order to actuate an actuator. Exemplary actuators include a switch, a sliding controller, a selection button, a so-called "radio style" button, and so forth. Multiple such related or unrelated actuators may be provided on a single display screen 102B, and the actuators may be moved around the screen as desired.

Implementation of a touch-sensitive screen feature as used herein refers to a "simulated" touch-sensitive functionality. In other words, physical pressure or contact need not be measured or determined. Such a simulated touch-sensitive functionality, or touch-sensitive feature, may entail actual touch or proximity. The sensed actual touching may be, for example, from the blockage of incident light caused by human skin such as a fingertip or by a pointing implement (or other physical object) contacting the screen. The sensed proximity may be, for example, from proximity of a human appendage or other physical object that is sufficient to block incident light from reaching the screen. Exemplary appropriate diode state configurations for display screen 102B are described further below with reference to FIG. 5B, and a related method is described below with reference to FIG. 8B.

For FIG. 4C, car radio 100C is an exemplary electronic device 100 that is used to describe an exemplary ambient light determination and compensation feature that may be implemented using display screen 102C. The multiple light emitting/detecting diodes 104 that are arranged into a two-dimensional (or 1-D) array on display screen 102C systematically emit, detect, and optionally become inactive in order to receive information representative of an ambient light level and to adjust a brightness amount of the light emissions from the diodes 104. For example, multiple such diodes 112 may be in a detecting state to determine a current ambient light level. The light amount that is emitted from diodes 110 that are in an emitting state are adjusted responsive to the determined current ambient light level. Exemplary appropriate diode state configurations for display screen 102C are described further below with reference to FIG. 5C, and a related method is described below with reference to FIG. 8C.

FIGS. 5A1, 5A2, and 5A3 illustrate exemplary diode state configurations 102A1, 102A2, and 102A3 for a scanning feature of a display screen 102A of a laptop 100A (as shown in FIG. 4A). Each of the exemplary diode state configurations 102A1, 102A2, and 102A3 illustrate different approaches to addressing crosstalk issues while minimizing or at least reducing scan time. Deleterious crosstalk can be encountered when a detecting diode is unable to properly receive information from a target document due to interference from other diodes.

Each light emitting/detecting diode is associated with another light emitting/detecting diode to form a light emitting/detecting diode pair 502. In each light emitting/detecting diode pair 502, one light emitting/detecting diode is in an emitting state and another light emitting/detecting diode is in a detecting state. Alternatively, both light emitting/detecting diodes may be in an inactive state in any given inactive light emitting/detecting diode pair.

Generally, in each active light emitting/detecting diode pair 502, one light emitting/detecting diode is emitting to produce light that illuminates the target document for scanning. The other light emitting/detecting diode is detecting to receive the light information as reflected off of the target document. In accordance with an appropriate systematic (or random) approach, each light emitting/detecting diode of each light emitting/detecting diode pair 502 takes a turn in an emitting state and in a detecting state. In described implementations, each light emitting/detecting diode pair 502 takes a turn at being active and at least one turn at being inactive.

A row 504 and a column 506 are indicated for diode state configuration 102A1. Row 504 relates to rows for individual light emitting/detecting diodes as well as rows for light emitting/detecting diode pairs 502. Column 506, on the other hand, relates to columns for individual light emitting/detecting diodes. Column 508 relates to columns for light emitting/detecting diode pairs 502. It should be understood that row and column terminology is relative and that individual light emitting/detecting diodes may be grouped into light emitting/detecting diode pairs 502 along columns, instead of rows as is illustrated.

When scanning a document using a display screen 102A of a laptop 100A, it is not necessary to scan pixel-by-pixel or even line-by-line because an entire two-dimensional array is available for receiving information in the form of reflected light. An entire document can be scanned simultaneously if an outside light source is applied with all diodes in a detecting state. However, when the light source comes from other diodes that are in an emitting state, it requires at least two phases and/or diode state configurations to complete one scan of one document if maximum diode resolution is desired.

Furthermore, light from the emitting diode of a first light emitting/detecting diode pair 502 may adversely impact the ability of a second, adjacent or proximate light emitting/detecting diode pair 502 to properly receive scanning information. This possible crosstalk is eliminated or sufficiently ameliorated by scanning in phases, as is described below.

In FIG. 5A1, diode state configuration 102A1 is one example of an approach to combating crosstalk. For each active light emitting/detecting diode pair 502, the four (4) light emitting/detecting diode pairs 502 that are immediately above and below and that are to the immediate left and right thereof are set to be inactive. In other words, every other light emitting/detecting diode pair 502 is active in all four (4) "cardinal" directions to institute a "checkerboard" configuration.

Generally, for such a diode state configuration 102A1, it takes four (4) phases to scan in the target document. Specifically, first and second phases entail a first set of light emitting/detecting diode pairs 502 alternating the two diodes between an emitting state and a detecting state. In other words, each diode of each light emitting/detecting diode pair 502 is given the opportunity to detect while the other emits and the opportunity to emit while the other detects. Third and fourth phases entail swapping which light emitting/detecting diode pairs 502 are active and which are inactive, with each diode taking a turn at emitting and a turn at detecting.

In FIG. 5A2, diode state configuration 102A2 is another example of an approach to combating crosstalk. Every third light emitting/detecting diode pair 502 is active while the other light emitting/detecting diode pairs 502 are inactive. In other words, for any given column 508 or row 504, every third light emitting/detecting diode pair 502 is active while the two interspersed light emitting/detecting diode pairs 502 are inactive. In diode state configuration 102A2, active light emitting/detecting diode pairs 502 are on the same rows 504, but this need not be the case, as is described below with reference to FIG. 5A3.

In FIG. 5A3, diode state configuration 102A3 is another example of an approach to combating crosstalk. For any given active column 508A, every other light emitting/detecting diode pair 502 is active. However, the active light emitting/detecting diode pair 502 in each active column 508A is offset with respect to the next nearest active column 508A. Two nearest active columns 508A are separated by an intervening inactive column 5081. There are therefore three (3) inactive light emitting/detecting diode pairs 502 that are interspersed between any two nearest active light emitting/detecting diode pairs 502 for any given row 504. Consequently, each active light emitting/detecting diode pair 502 is surrounded by a "circle" or "square" of inactive light emitting/detecting diode pairs 502.

Other diode state configurations for implementing a scanning feature may alternatively be employed. For example, different spacing between the columns and rows from the spacing that is illustrated and described may be used. Also, instead of a "rigid" light emitting/detecting diode pair 502 approach, multiple light emitting/detecting diodes may enter an emitting state. Each of the eight light emitting/detecting diodes that surround the emitting diode may then enter a detecting diode state for receiving scanning information from the target document. Alternatively, for each detecting diode, the eight (8) diodes that surround it may systematically enter an emitting state to thereby enable the detecting diode to take eight (8) light level readings. These eight (8) light level readings may be averaged to determine a final light value to be used for the respective pixel of the scanned result. Four (4) emitting diodes may be used instead with an average based thereon, or eight (8) surrounding diodes may emit simultaneously to enable a central detecting diode to take one light level reading.

The firmware, software, or other instructions that execute the scanning feature may be tailored to implement any one or multiple such diode state configurations. Which particular diode state configuration is preferable (e.g., which one enables a fastest scan with acceptable crosstalk levels) may depend on a number of factors, such as the desired resolution, the distance between the display screen 102A and the target document, the physical distance between adjacent light emitting/detecting diodes, the precision of the light emitting/detecting diodes, the interpolation capabilities of the scanning programming (algorithm), and so forth.

Figure 5B:
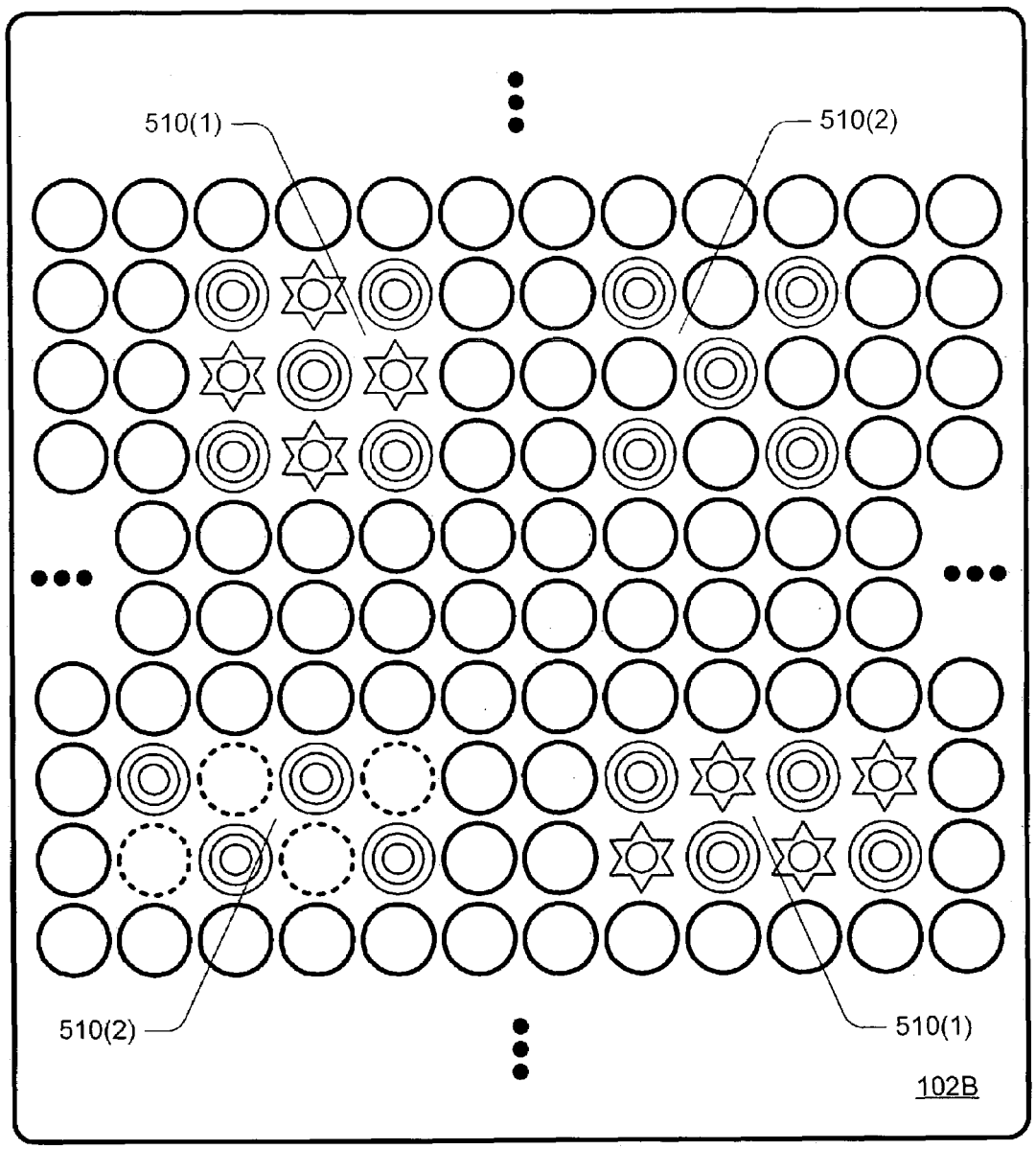
FIG. 5B illustrates an exemplary diode state configuration for a touch-sensitive feature of a separate display screen.

FIG. 5B illustrates an exemplary diode state configuration 102B for a touch-sensitive feature of a separate display screen 100B (as shown in FIG. 4B). Four (4) touch sensitive actuators 510 are illustrated. Actuators 510 "detect touch" by actually detecting the elimination or at least reduction of the light that is incident on one or more light emitting/detecting diodes that are in a detecting state. As noted above, implementing such a touch-sensitive feature can simulate touch-sensitive functionality.

Initially, and optionally periodically during use, emitting/detecting diodes that are in a detecting state determine an ambient light level. This ambient light level may be determined for the entire display screen 102B, for regions or blocks of the display screen 102B, for areas corresponding to actuators 510, some combination thereof, and so forth. Subsequently, if a detected light level falls below this ambient light level in the area of an actuator 510, then that actuator 510 is considered to have received user input and the actuator 510 is thus actuated. This comparison of the current detected light level may be made to the ambient light level as reduced by some threshold to account for random, sudden, and/or moving shadows, and so forth. Additionally, the comparison may merely be implemented or considered as a detection of a change from one (e.g., ambient) light level at one instant to a different, lower light level at a succeeding instant, such as the immediately succeeding instant.

Although four actuators 510 are shown, more or fewer than four may be included for diode state configuration 102B. Additionally, although each of actuators 510 are illustrated as including either eight (8) or nine (9) light emitting/detecting diodes, they may actually include more or fewer of such diodes. In fact, actuators 510 will typically include dozens, hundreds, or more diodes to facilitate a resolution appropriate for a finger, a pen, or another pointing device. The light emitting/detecting diodes may also be setup to accommodate some touch location flexibility and imprecision.

It should also be noted that the regions of actuators 510(1) of display screen 102B may be comprised of different ratios of emitting diodes and detecting diodes than those that are illustrated, or even be entirely comprised of detecting diodes. Actuators 510(2) illustrate other alternatives of the many possible alternatives. Specifically, actuators 510(2) illustrate actuators 510 that combine detecting diodes with general diodes and inactive diodes. Other combinations are possible.

Actuators 510 may represent any type of switch, button, or other control that may be actuated via touch. Examples of actuators 510 include flippable switches, toggle switches, slidable switches, "OK"/"Cancel" buttons, radio-style buttons, selection buttons, a keypad/keyboard, a motion direction/distance/speed sensing area to mimic input from a mouse/trackball/dial/etc. for a cursor or similar pointing icon or screen location indicator, selection of a menu bar or item thereon, and so forth. The instructions for executing the touch-sensitive feature of screen 102B need merely be adapted to detect and analyze the various "touches" and movements, and the constituent diodes of actuators 510 may be likewise configured to sense such "touches" and movements. The constituent diodes may also be configured via selective activation of diodes in emitting states to visually present an indication of the existence of and type of actuator 510.

The instructions for executing the touch-sensitive feature of screen 102B may be adapted to reject spurious and/or accidental "touches". When a touch is detected by a change in light detection at one or more light emitting/detecting diodes that are in a detecting state of an actuator 510, the instructions may ensure that the touch was intended. For example, if much or the entirety of display screen 102B simultaneously detects a light reduction, then the "touch" is dismissed as a change in the ambient lighting environment. Also, if a large number of emitting/detecting diodes that are in a detecting state detect a reduction in the detected light that are near, but outside the bounds of the relevant actuator 510, then the "touch" can be dismissed as an accidental contact with display screen 102B.

Figure 5C:
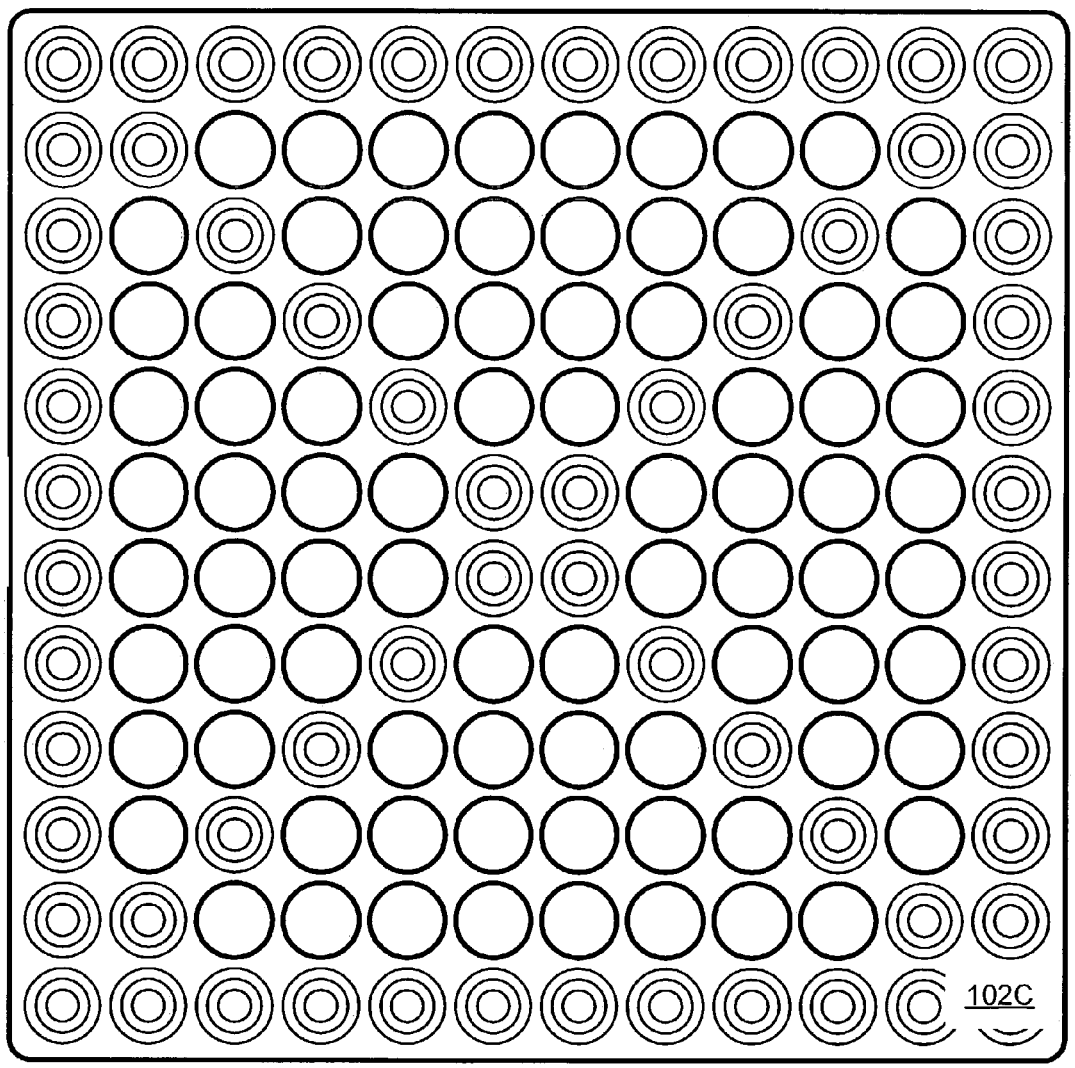
FIG. 5C illustrates an exemplary diode state configuration for an ambient light determination and compensation feature of a display screen of a car radio.

FIG. 5C illustrates an exemplary diode state configuration 102C for an ambient light determination and compensation feature of a display screen of a car radio 100C. One or more light emitting/detecting diodes of an array of such diodes are activated into a detecting state. These light emitting/detecting diodes that are activated in a detecting state may be located anywhere on display screen/diode state configuration 102C. They may also be of any number and of any distribution across display screen 102C. It should be noted that display screen 102C can include more (or fewer) than the illustrated number of light emitting/detecting diodes.

In the illustrated and described implementation, exemplary diode state configuration 102C includes light emitting/detecting diodes that are in a detecting state around the border of display screen 102C and in an "X" pattern across the inner area of display screen 102C. Alternatively, every $n^{th}$ light emitting/detecting diode may be activated into a detecting state and assigned the task of determining the ambient light level. Other possible configurations include establishing ambient-light-level-determining zones of a predetermined number of pixels in various locations on display screen 102C, randomly distributing light emitting/detecting diodes that are in a detecting state, and so forth. Also, a light emitting/detecting diode that is in a detecting state for ambient light level determination at one time may be in a different (e.g., emitting) state at another time.

After the ambient light level has been determined, the ambient light level is compared to a predetermined threshold or thresholds. Each determined ambient light level may be mapped to a corresponding appropriate light amount output for emitting/detecting diodes that are in an emitting state (not specifically indicated in FIG. 5C). The emitting/detecting diodes that are in an emitting state (e.g., all or a portion of light emitting/detecting diodes as illustrated) are thereafter instructed to emit at a luminosity corresponding to the appropriate light amount.

Thus, if the determined ambient light level increases (e.g., as ascertainable by a comparison to a predetermined threshold, including a previous value of the ambient light level), the light amount output by emitting diodes can be increased to compensate for the increased ambient light level to avoid "wash out" of the displayed image. Similarly, if the determined ambient light level decreases, the light amount output by emitting diodes can be decreased to compensate for the decreased ambient light level to avoid having the displayed image be too glaring.

In other described implementations, ambient light determination and compensation may be effectuated across only part of the display screen 102C and/or may be effectuated unit-by-unit across display screen 102C. Thus, display screen 102C may be divided into blocks of any given size for block-by-block determination and compensation. For example, the analysis granularity may be accomplished in square-inch blocks, in square-centimeter blocks, at a diode pair level, or at some other size. Consequently, if a streak of sunlight hits part of display screen 102C, then only that part of the display screen may be brightened.

The scanning, touch-sensitivity, and ambient light determination and compensation features may be implemented and/or combined in a myriad of manners beyond those that are explicitly described herein. For example, different features than those specifically described may be implemented on other electronic devices. In other words, and by way of example only, ambient light determination and compensation may be implemented on a separate display screen that is being used as a sign, a billboard, and so forth. As another example, a single electronic device may have two or more of the described features. In other words, and by way of example only, a laptop may be made capable of scanning documents and of providing a touch-sensitivity feature via its display screen.

Figure 6:
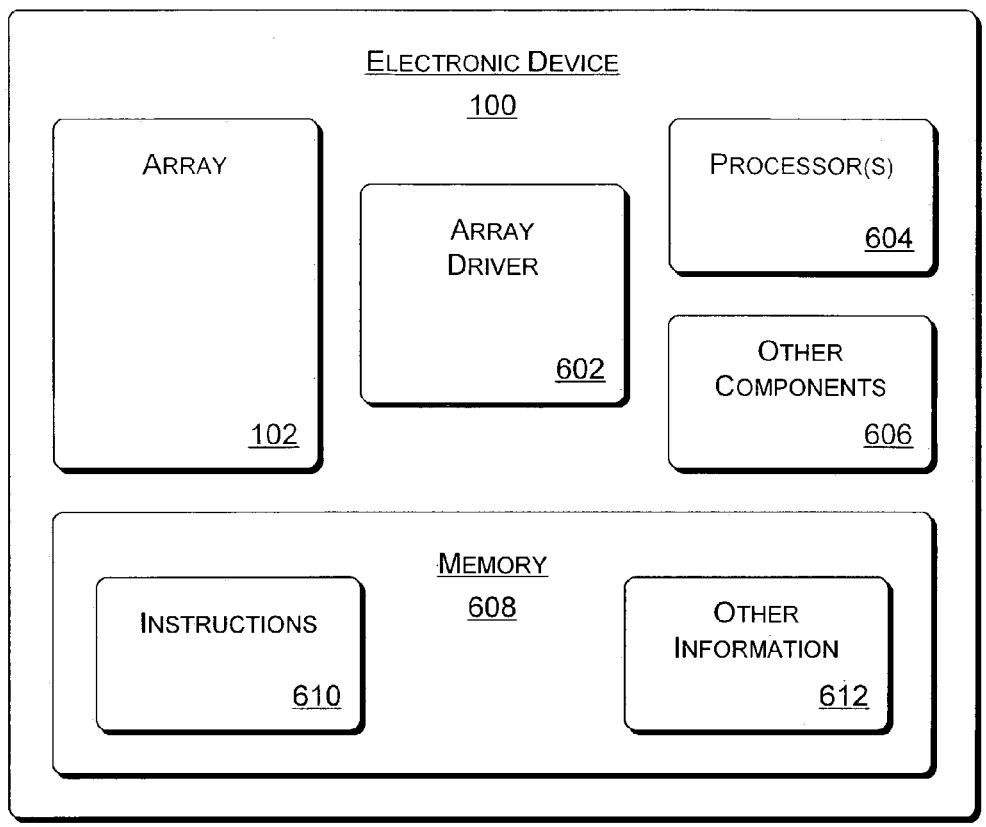
FIG. 6 is an electronic device that illustrates exemplary components thereof, including an array of light emitting/detecting diodes.

FIG. 6 is an electronic device 100 that illustrates exemplary components thereof, including at least one array 102 of light emitting/detecting diodes (or light emitting/detecting elements generally). Array 102 comprises at least part of a screen, such as a display screen that is capable of emitting light (e.g., by presenting information visually) and that is capable of detecting light information. Electronic device 100 includes at least one array driver 602, one or more processors 604, one or more memories 608, and optionally other component(s) 606. Memory 608 includes instructions 610 and optionally other information 612.

Instructions 610 of memory 608 comprise electronically-executable instructions that may be executed by processors 604. The electronically-executable instructions of instructions 610 include those that enable one or more of the following features to be implemented with array 102: scanning, touch-screen sensitivity, and ambient light determination and compensation. These features are described above and further below with reference to the flow diagrams of FIGS. 7-8C.

Generally, processors 604 process various instructions to control the operation of electronic device 100 and optionally to communicate with other electronic devices. Execution of such instructions enables array driver 602 to drive the diodes of array 102 into emitting, detecting, and inactive states so as to implement a given feature or features. Other components 606 are representative of other electrical, mechanical, and/or electromechanical components of electronic device 100, depending on the electronic device 100. For example, other components 606 may include a keyboard, a network interface, knobs/buttons, and so forth.

Memory 608, which is an example of storage media, may be realized as random access memory (RAM), flash memory, programmable read-only memory (PROM), read-only (non-erasable) memory (ROM), electrically programmable read-only memory (EPROM), electrically erasable programmable read-only memory (EEPROM), some other non-volatile (e.g., solid state) memory, a mass memory such as a hard disk, a network transmission medium, an optical or magneto-optical memory format, a floppy disk, some combination thereof, and so forth. Any of these memory types may be integrated with or removably coupled to electronic device 100. Other information 612 represents other types of information, including instructions or data, that may be utilized by electronic device 100 to implement a function thereof.

Applications implementing features using a display screen with light emitting/detecting diodes may be described in the general context of electronically-executable instructions. Generally, electronically-executable instructions include routines, programs, objects, components, data structures, and the like that perform particular functions or implement particular abstract data types. Implementing features using a screen with light emitting/detecting diodes as described herein may also be effectuated in distributed environments where functions are performed by processing components that are remote from the affected screen but connected through a communications link or otherwise remotely coupled thereto. Especially in such distributed environments, electronically-executable instructions may be located in both local and remote storage media, as well as in signals extant on one or more transmission media.

Figure 7:
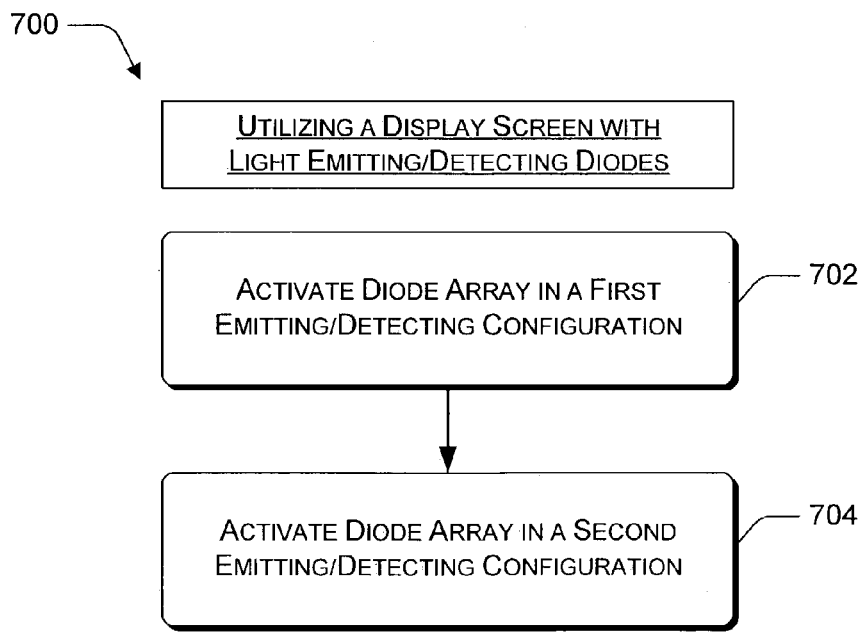
FIG. 7 is a flow diagram that illustrates an exemplary method for utilizing a display screen with light emitting/detecting diodes.
Figure 8A:
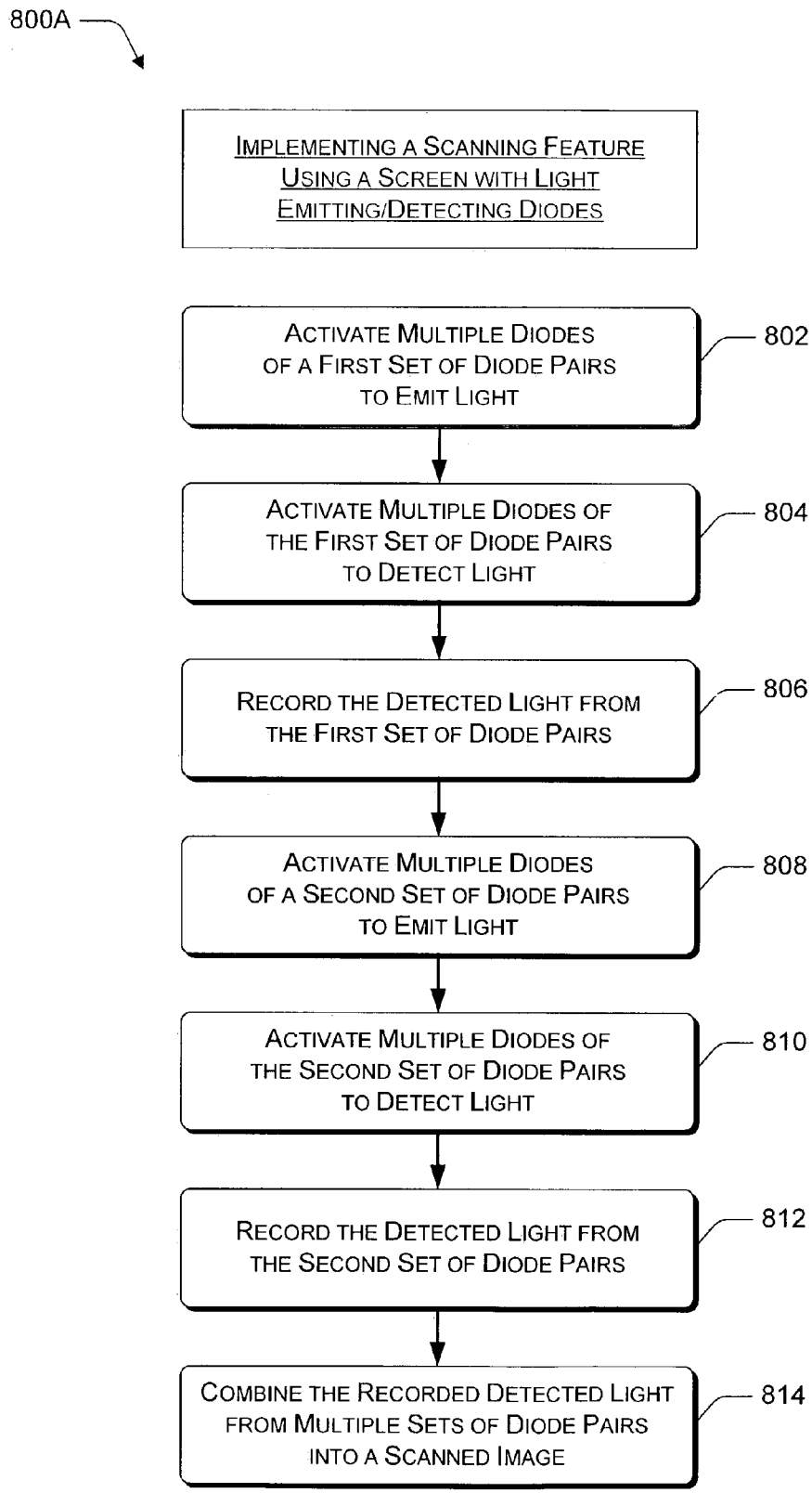
FIG. 8A is a flow diagram that illustrates an exemplary method for implementing a scanning feature using a display screen with light emitting/detecting diodes.
Figure 8B:
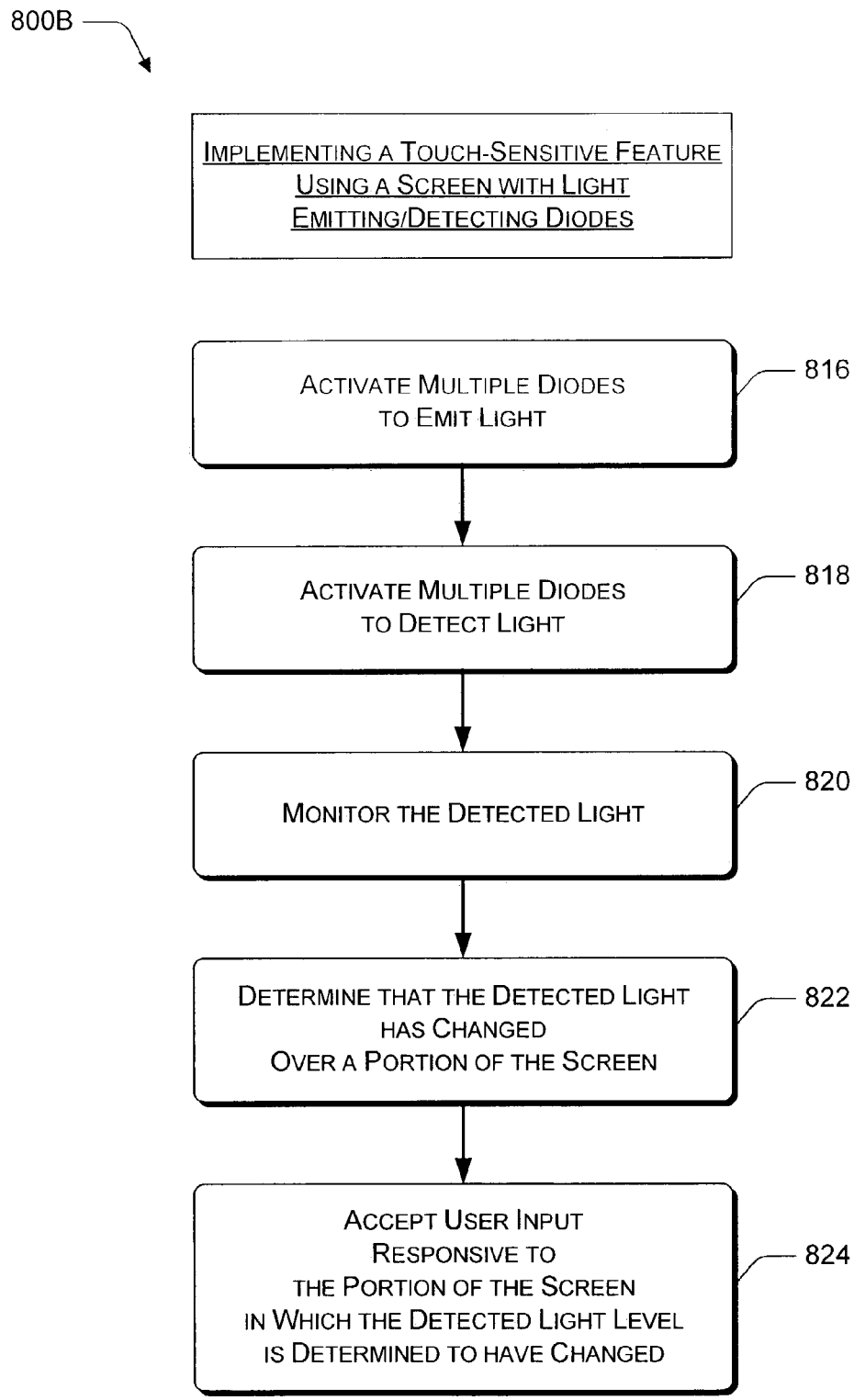
FIG. 8B is a flow diagram that illustrates an exemplary method for implementing a touch-sensitive feature using a screen (e.g., a display screen with light emitting/detecting diodes).
Figure 8C:
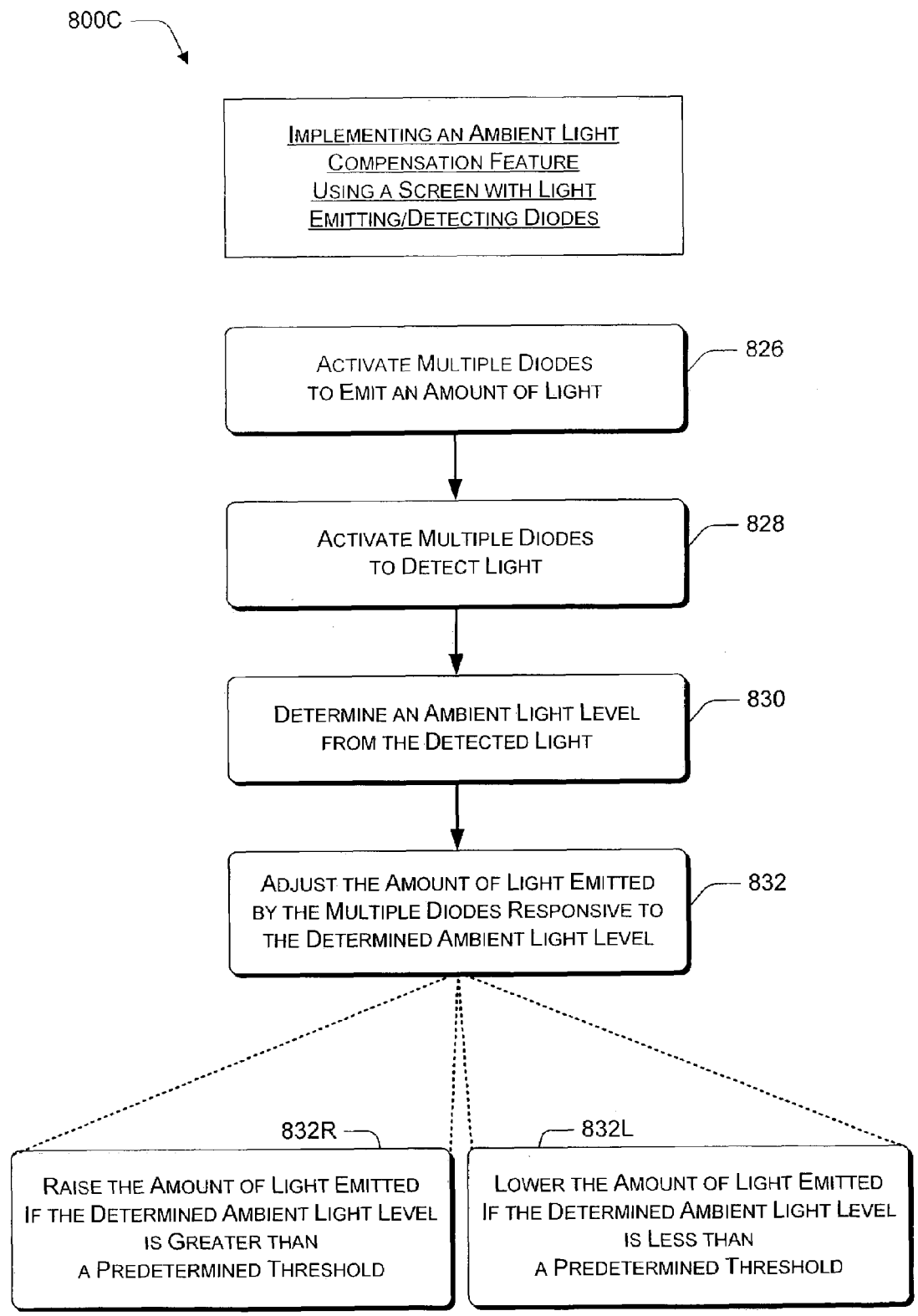
FIG. 8C is a flow diagram that illustrates an exemplary method for implementing an ambient light determination and compensation feature using a display screen with light emitting/detecting diodes.

The methods of FIGS. 7-8C are illustrated in flow diagrams divided into multiple method blocks. However, the order in which the methods are described is not intended to be construed as a limitation, and any number of the described method blocks can be combined in any order to execute one or more methods for implementing features using a display screen with light emitting/detecting diodes. The action(s) for any method block may also be performed fully or partially simultaneously with those of any other method block or blocks. Furthermore, although the methods of FIGS. 7-8C are described below with reference to electronic device 100 and FIGS. 3-5C where applicable, the methods can be implemented in any suitable hardware, software, firmware, or combination thereof and using any appropriate diode state configuration or configurations.

FIG. 7 is a flow diagram 700 that illustrates an exemplary method for utilizing a display screen with light emitting/detecting diodes. Any of the described features such as scanning, touch-screen sensitivity, and ambient light determination and compensation, etc. that utilize a display screen 102 of an electronic device 100 may be implemented in accordance with the method of flow diagram 700.

At block 702, a diode array of a display screen is activated in a first emitting/detecting configuration. At block 704, the diode array of the display screen is activated in a second emitting/detecting configuration. The diode array is composed at least partially of light emitting/detecting diodes 104. For example, the first emitting/detecting configuration may correspond to the activation of a first set of light emitting/detecting diode pairs 502 while the second emitting/detecting configuration may correspond to a switched emitting and detecting state of the first set of light emitting/detecting diode pairs 502 and/or the activation of a second set of light emitting/detecting diode pairs 502 in different phases in order to scan a document more completely and/or accurately. Any detected light data collected through such emitting/detecting configurations may thus be processed to implement a feature for the electronic device 100.

As another example, the first emitting/detecting configuration may correspond to the presentation of a first set of actuators 510 while the second emitting/detecting configuration may correspond to the actuation, and visual confirmation thereof, of the first set of actuators 510 and/or the presentation of a second set of actuators 510 to thereby provide a touch screen sensitivity feature to display screen 102. Also, the first emitting/detecting configuration may correspond to a first layout of emitting diodes 110 and detecting diodes 112 while the second emitting/detecting configuration may correspond to a change in the luminosity of one or more of the emitting diodes 110 and/or to a second layout of emitting diodes 110 and detecting diodes 112 in order to implement ambient light determination and compensation for display screen 102.

FIG. 8A is a flow diagram 800A that illustrates an exemplary method for implementing a scanning feature using a display screen 102 with light emitting/detecting diodes 104. The scanning feature may be activated by a menu option (e.g., optionally in conjunction with closing a top or screen portion 100AT of a laptop 100A), by pressing a dedicated scan button on a laptop 100A or other electronic device 100, and so forth. At block 802, multiple diodes of a first set of diode pairs are activated to emit light. The first set may correspond to any diode state configuration that accounts for possible crosstalk, including those described above with reference to FIGS. 5A1-5A3. At block 804, multiple diodes of the first set of diode pairs are activated to detect light. The detected light represents scanned image data prior to processing.

At block 806, the detected light from the first set of diode pairs is recorded. For example, the detected light data may be stored in memory 608 (e.g., as part of other information 612). Actions of blocks 802 and 804 may correspond to a first phase of scanning. A second phase may entail switching which multiple diodes are emitting and which multiple diodes are detecting. Detected light data of such a second phase may also be recorded as an action of block 806.

At block 808, multiple diodes of a second set of diode pairs are activated to emit light. The second set may correspond to any diode state configuration that accounts for possible crosstalk and differs from the first set, including those described above with reference to FIGS. 5A1-5A3. For example, if a "checkerboard" diode state configuration is utilized, then the first set may correspond to all of the "black" squares and the second set may correspond to all of the "red" squares. At block 810, multiple diodes of the second set of diode pairs are activated to detect light. The detected light represents additional scanned image data prior to processing.

At block 812, the detected light from the second set of diode pairs is recorded. For example, this (additional) detected light data may also be stored in memory 608. Actions of blocks 808 and 810 may correspond to a second phase of scanning if, for example, the actions of blocks 802 and 804 correspond to a first scanning phase. These actions of blocks 808 and 810 may alternatively correspond to third and fourth scanning phases if, for example, they entail switching which multiple diodes are emitting and which multiple diodes are detecting and the actions of blocks 802 and 804 correspond to first and second scanning phases. Such (additional) detected light data of the second scanning phase or the third and fourth scanning phases may also be recorded as an action at block 812.

At block 814, the recorded detected light from multiple sets of diode pairs are combined into a scanned image. The pre-processed detected light data and the additional detected light data are combined into a scanned image. The scanned image may optionally be processed using averaging, interpolation, or any other scan processing algorithm. In flow diagram 800A, the actions of blocks 802 and 804 may in particular be performed fully or partially simultaneously with each other. Similarly, the actions of blocks 808 and 810 may also occur fully or partially contemporaneously.

FIG. 8B is a flow diagram 800B that illustrates an exemplary method for implementing a touch-sensitive feature using a screen (e.g., a display screen 102 with light emitting/detecting diodes 104). At block 816, multiple diodes are activated so as to emit light. This is an optional action that may include causing diodes 110 to activate such that an actuator 510 is presented visually on display screen 102. At block 818, multiple diodes are activated so as to detect light. The actions of blocks 816 and 818 may also in particular be performed fully or partially simultaneously with each other. The detecting diodes 112 are capable of detecting a "screen touch" as follows.

At block 820, the detected light is monitored. For example, a current and/or average ambient light level may be detected essentially constantly or repeatedly at intervals. At block 822, whether the detected light has changed over a portion of the display screen is determined. For example, it is determined whether a detected light level at and optionally around actuator 510 decreases, while the remainder of display screen 102 continues to receive a relatively constant light level.

At block 824, user input is accepted responsive to the portion of the screen in which the detected light level is determined to have changed. In other words, when an area of display screen 102 is designated as an actuator 510 with an associated user input function, reducing the level of light detected by detecting diodes 112 in this area results in actuation of actuator 510 and therefore the associated user input function is started and/or completed.

FIG. 8C is a flow diagram 800C that illustrates an exemplary method for implementing an ambient light determination and compensation feature using a display screen 102 with light emitting/detecting diodes 104. Implementation of this method can reduce the likelihood that information presented on display screen 102 becomes "washed out" in bright light or becomes "glaring" or distracting in low light. At block 826, multiple diodes are activated to emit an amount of light. All or a portion of these diodes may also be capable of detecting light as light emitting/detecting diodes 104.

At block 828, multiple diodes are activated to detect light. These diodes may be located anywhere on display screen 102 as is described above with reference to FIG. 5C, including being distributed evenly across display screen 102. These diodes may be detecting light at one moment for the action(s) of block 828 and emitting an amount of light at another moment for the action(s) of block 826. And if at least some of the multiple diodes are different, then the actions of blocks 826 and 828 may also in particular be performed fully or partially simultaneously with each other.

At block 830, an ambient light level may be determined from the detected light. This ambient light level may be the same for the entirety of display screen 102 or independently determined for each granular portion thereof. Also, this ambient light level may be determined by detecting light at each given instant of interest, by temporally averaging detected light over two or more instants of interest, by spatially averaging over multiple detecting diodes 112 within a defined granular portion or across more than one granular portion, and so forth.

At block 832, the amount of light emitted by the multiple emitting diodes is adjusted responsive to the determined ambient light level. The amount of light emitted is adjusted to try to avoid, minimize, or at least reduce "wash out" and distracting "glare". As described above especially with reference to FIGS. 4C and 5C, any or all of the actions of blocks 826-832 may be performed at any desired granular level. Hence, by way of example only, the adjustment of the amount of light emitted (of block 832) may be performed in the vicinity of the determination of the ambient light level (of block 830).

For example, at block 832R, the amount of light emitted is raised/increased if the determined ambient light level is greater than a predetermined threshold. This predetermined threshold may be permanently pre-set at the factory or user-adjustable. At block 832L, the amount of light emitted is lowered/decreased if the determined ambient light level is less than a predetermined threshold. These predetermined thresholds may be the same (e.g., be a single threshold) or they may be different. When multiple thresholds and light amounts are utilized in an implementation, the implementation may be considered to have a mapping of emitting light amounts to determined ambient light levels.

Although implementation(s) of apparatuses, methods, systems, and arrangements have been illustrated in the accompanying Drawings and described in the foregoing Detailed Description, it will be understood that the present invention is not limited to the implementation(s) explicitly disclosed, but is capable of numerous rearrangements, modifications, substitutions, etc. without departing from the spirit and scope set forth and defined by the following claims.

What is claimed is:

1. A computer capable of implementing a scanning feature, the computer comprising:
    a display screen including an array of elements, each individual element of the array of elements capable of emitting light and detecting light;
    wherein the computer is adapted to use the elements of the array of elements to display graphical images; and
    wherein the computer is adapted to use the elements of the array of elements to emit light onto a scanning target and to detect light reflected from the scanning target in order to produce a scanned image of the scanning target,
    wherein the computer is further adapted to produce the scanned image using a plurality of element state configurations for the array of elements,
    wherein a first of the element state configurations for the array of elements includes activation of a first set of pairs of the elements, and wherein a second of the element state configurations for the array of elements includes at least one of a switched emitting and detecting state of the first set of pairs of the elements and activation of a second set of pairs of the elements.

2. An electronic device capable of implementing a scanning feature, the electronic device comprising:
    a display screen including a plurality of light emitting/detecting elements, each individual light emitting/detecting element capable of light emission and light detection;
    wherein the electronic device is configured to:
    display graphical images using the light emitting/detecting elements; and
    illuminate a scanning target using the light emission capability of a first set of the light emitting/detecting elements;
    collect light detection data representative of at least part of the scanning target using the light detection capability of a second set of the light emitting/detecting elements; and
    process the light detection data to produce an image of at least a portion of the scanning target.

3. The electronic device of claim 2, wherein each individual light emitting/detecting element includes a single diode adapted to emit light at one moment and detect light at another moment.

4. The electronic device of claim 2, wherein each light emitting/detecting element is associated with another light emitting/detecting element to form a pair of elements, and wherein each light emitting/detecting element of each pair of elements operates in an emitting state at one moment and a detecting state at another moment.

5. A method comprising actions of:
    displaying graphical images using an array of light emitting/detecting elements, each individual light emitting/detecting element capable of light emission and light detection;
    activating a first plurality of the light emitting/detecting elements in a first emission/detection element state configuration to produce detected light data of a target document;
    activating a second plurality of the light emitting/detecting elements in a second emission/detection element state configuration to produce additional detected light data of the target document; and
    combining the detected light data and the additional detected light data to produce at least part of a scanned image of the target document.

6. The method of claim 5, further comprising the actions of:
    recording the detected light data; and
    recording the additional detected light data.

7. The method of claim 5, wherein the actions of activating comprise the action of logically organizing a plurality of light emitting/detecting elements into a plurality of light emitting/detecting element pairs, wherein each light emitting/detecting element of each of the light emitting/detecting element pairs is selectively activated to emit light and to detect light.

8. The method of claim 5, wherein the action of combining comprises at least one action selected from the group comprising: amalgamating the detected light data and/or the additional detected light data, averaging the detected light data and/or the additional detected light data, and interpolating the detected light data and/or the additional detected light data.

9. The method of claim 5, wherein the first emission/detection element state configuration includes activation of a first set of pairs of the light emitting/detecting elements, and wherein the second emission/detection element state configuration includes at least one of a switched emitting and detecting state of the first set of pairs of the light emitting/detecting elements and activation of a second set of pairs of the light emitting/detecting elements.

10. The method of claim 5, wherein each individual light emitting/detecting element includes a single diode adapted to emit light at one moment and detect light at another moment.

11. A display comprising:
an array of elements, each individual element of the array of elements capable of emitting light and detecting light; and
at least one processor configured to execute instructions for:
activating elements in the array of elements to display graphical images; and
activating elements in the array of elements to emit light onto a scanning target; and
activating elements in the array of elements to detect light reflected from the scanning target in order to produce a scanned image of the scanning target,
wherein the at least one processor is further configured to execute instructions for producing the scanned image using a plurality of element state configurations for the array of elements,
wherein a first of the element state configurations for the array of elements includes activation of a first set of pairs of the elements, and wherein a second of the element state configurations for the array of elements includes at least one of a switched emitting and detecting state of the first set of pairs of the elements and activation of a second set of pairs of the elements.

12. A display comprising:
an array of elements, each individual element of the array of elements capable of emitting light and detecting light; and
at least one processor configured to execute instructions for:
activating elements in the array of elements to display graphical images; and
activating elements in the array of elements to emit light onto a scanning target; and
activating elements in the array of elements to detect light reflected from the scanning target in order to produce a scanned image of the scanning target,
wherein each element of the array of elements is associated with another element of the array of elements to form a pair of elements, and wherein each element of each pair of elements operates in an emitting state at one moment and a detecting state at another moment.

13. The display of claim 12, wherein each individual element of the array of elements includes a single diode adapted to emit light at one moment and detect light at another moment.

14. A computer capable of implementing a scanning feature, the computer comprising:
a display screen including an array of elements, each individual element of the array of elements capable of emitting light and detecting light;
wherein the computer is adapted to use the elements of the array of elements to display graphical images; and
wherein the computer is adapted to use the elements of the array of elements to emit light onto a scanning target and to detect light reflected from the scanning target in order to produce a scanned image of the scanning target,
wherein each element of the array of elements is associated with another element of the array of elements to form a pair of elements, and wherein each element of each pair of elements operates in an emitting state at one moment and a detecting state at another moment.

15. The computer of claim 14, wherein each individual element of the array of elements includes a single diode adapted to emit light at one moment and detect light at another moment.

* * * * *